United States Patent [19]
Ammon et al.

[11] Patent Number: 5,574,746
[45] Date of Patent: Nov. 12, 1996

[54] MELTING FURNACE FOR THERMAL TREATMENT OF SPECIAL WASTES CONTAINING HEAVY METALS AND/OR DIOXIN

[75] Inventors: Hans Ammon, Wettingen; Markus Pfister, Fislisbach; Christian Wieckert, Seon, all of Switzerland

[73] Assignee: ABB K.K., Tokyo, Japan

[21] Appl. No.: 268,563

[22] Filed: Jul. 6, 1994

[30] Foreign Application Priority Data

Jul. 6, 1993 [DE] Germany .................. 43 22 448.2

[51] Int. Cl.⁶ ........................................... F27D 17/00
[52] U.S. Cl. .................. 373/9; 373/32; 373/35; 373/41; 65/135.8
[58] Field of Search ............... 373/8, 9, 27, 30–35; 65/135.8, 174

[56] References Cited

U.S. PATENT DOCUMENTS

| | | | |
|---|---|---|---|
| 2,331,052 | 10/1943 | Shadduck | 65/134.4 |
| 2,413,037 | 12/1946 | De Voe | 373/31 |
| 2,490,339 | 12/1949 | De Voe | 373/31 |
| 4,345,106 | 8/1982 | Canfield et al. | 373/27 |

FOREIGN PATENT DOCUMENTS

487770A1  6/1992  European Pat. Off. .

*Primary Examiner*—Tu Hoang
*Attorney, Agent, or Firm*—Oblon, Spivak, McClelland, Maier & Neustadt, P.C.

[57] ABSTRACT

A melting furnace for thermal treatment of heavy metal-containing and/or dioxin-containing special wastes, including a clog preventing system including a principal furnace vessel, which exhibits a melting tank for holding a melt; at least one feeder for feeding the material to be treated; a discharge chamber, which is at a spatial distance from the feeder, the feeder being connected gas-tight via a siphon to the melting tank; the principal furnace vessel and the discharge chamber having third heating elements in the form of bath electrodes, by means of which an electric current can be run through the melt and the siphon for additional heating of the melt.

6 Claims, 4 Drawing Sheets

MELTING FURNACE FOR THERMAL TREATMENT OF SPECIAL WASTES CONTAINING HEAVY METALS AND/OR DIOXIN

TECHNICAL FIELD

The invention proceeds from a melting furnace for thermal treatment of heavy metal-containing and/or dioxin-containing special wastes, comprising a furnace vessel, which exhibits a melting tank for holding a melt; at least one feeder for feeding the material to be treated: at least one discharge chamber, which is at a spatial distance from the feeder and which is connected gas-tight via a siphon to the melting tank; at least one first heater, projecting into the interior of the furnace vessel, and at least one second heater projecting into the discharge chamber.

A melting furnace of this design is known, for example, from the European patent application with the publication number 0 487 770.

STATE OF THE ART

When poisonous, volatile chemical compounds comprising a number of solid particles are separated out, electrofilter dust from industrial incinerator plants with pollutants that are harmful to the environment, such as heavy metals and their compounds, is heated in a melting furnace up to a temperature exceeding 1400° C. The evaporating, poisonous chemical compounds and elements are removed, condensed and extracted via an exhaust from the melting furnace. The residue that has not evaporated is melted in succession and the melt is extracted continuously or intermittently from the reaction chamber and then solidified. For the purpose of heating, electric heaters are provided in the gas chamber of the melting furnace. Said heaters are separated from the furnace atmosphere by means of ceramic protective tubes.

The extraction process occurs frequently from a separate discharge chamber, which is connected gas-tight via a siphon to the actual melting furnace. Thus, poisonous gases are prevented from entering the discharge chamber and thus getting into the environment. During normal operations the melt levels in the melting furnace and in the discharge chamber are equal.

The connection of both normally separately heated furnaces (principal furnace 1 and discharge chamber 15) is a critical region especially in phases with small throughput of the material to be vitrified or during the start-up phase. It can happen that the melt gets too cold there and thus no longer flows very readily. The results are undesired differences in the levels in the two furnaces.

PRESENTATION OF THE INVENTION

Proceeding from the well-known melting furnace, the invention is based on the problem of providing a melting furnace for thermal treatment of special wastes that contain heavy metals and/or dioxin, while ensuring that the free connection between the principal furnace and the discharge chamber is reliably guaranteed.

This problem is solved according to the invention by providing in the principal furnace vessel and in the discharge chamber third heating elements in the form of bath electrodes, by means of which an electric current can be run through the melt and the siphon for additional heating of the melt.

With the use of these bath electrodes it is possible to maintain the melt in the region upstream of, in and downstream of the siphon at a sufficiently high temperature that the siphon is prevented by a reliable method from getting clogged in any operating phase; and thus there are no longer any undesired level differences in both furnace regions. The bath electrodes can project either laterally and/or also from the bottom into the melt. Laterally arranged bath electrodes are usually easier to push forward, whereas bath electrodes that project starting from the bottom require less space, assuming adequate height of the furnace bottom above the building floor.

SHORT DESCRIPTION OF THE DRAWINGS

In the following the invention is explained with reference to an embodiment of a melting furnace for thermal treatment of special wastes, containing heavy metals and/or dioxin.

METHODS OF IMPLEMENTING THE INVENTION

Figure 1:
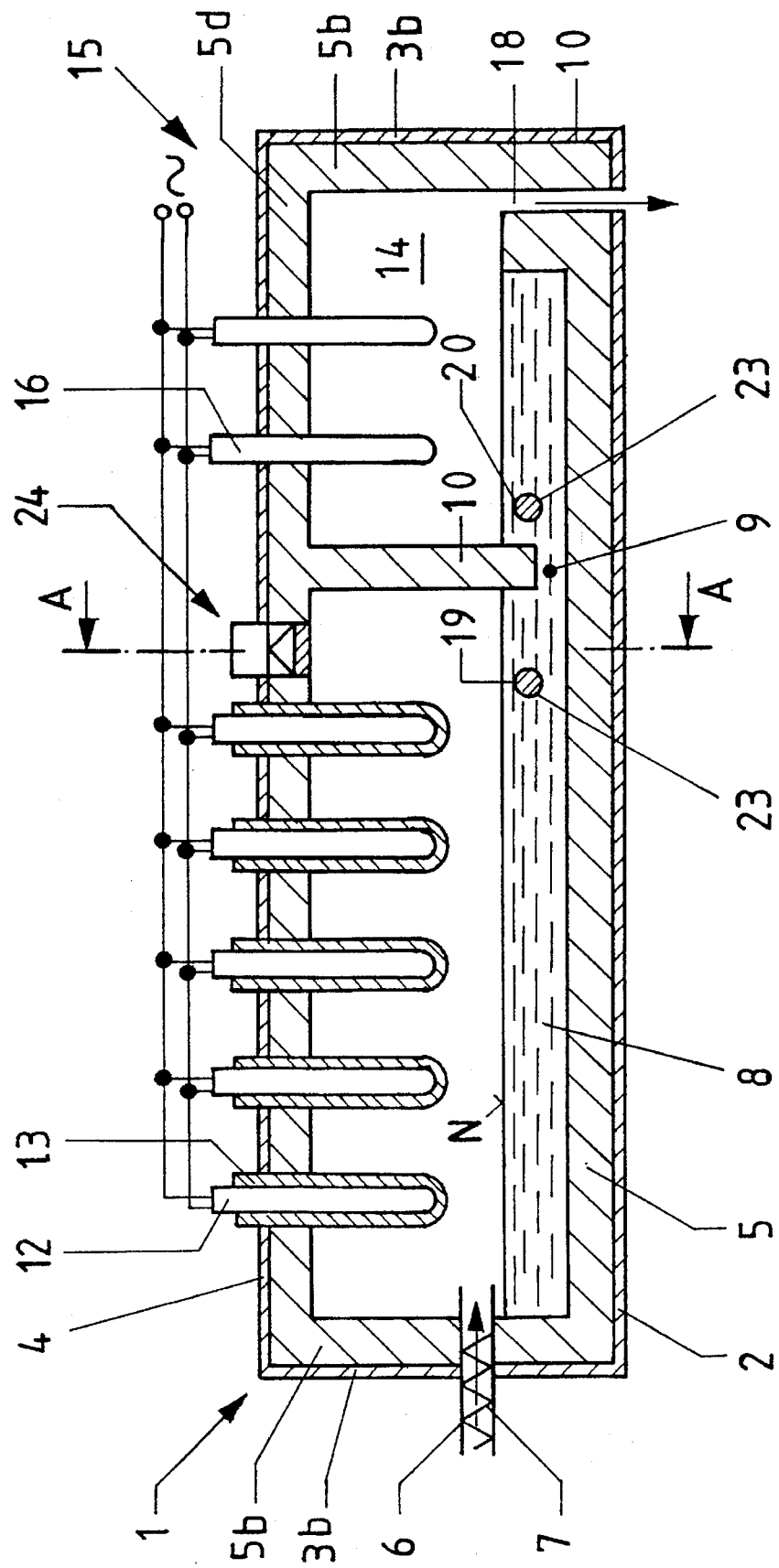
FIG. 1 is a longitudinal view of a melting furnace, comprising a principal furnace and a discharge chamber.
Figure 2:
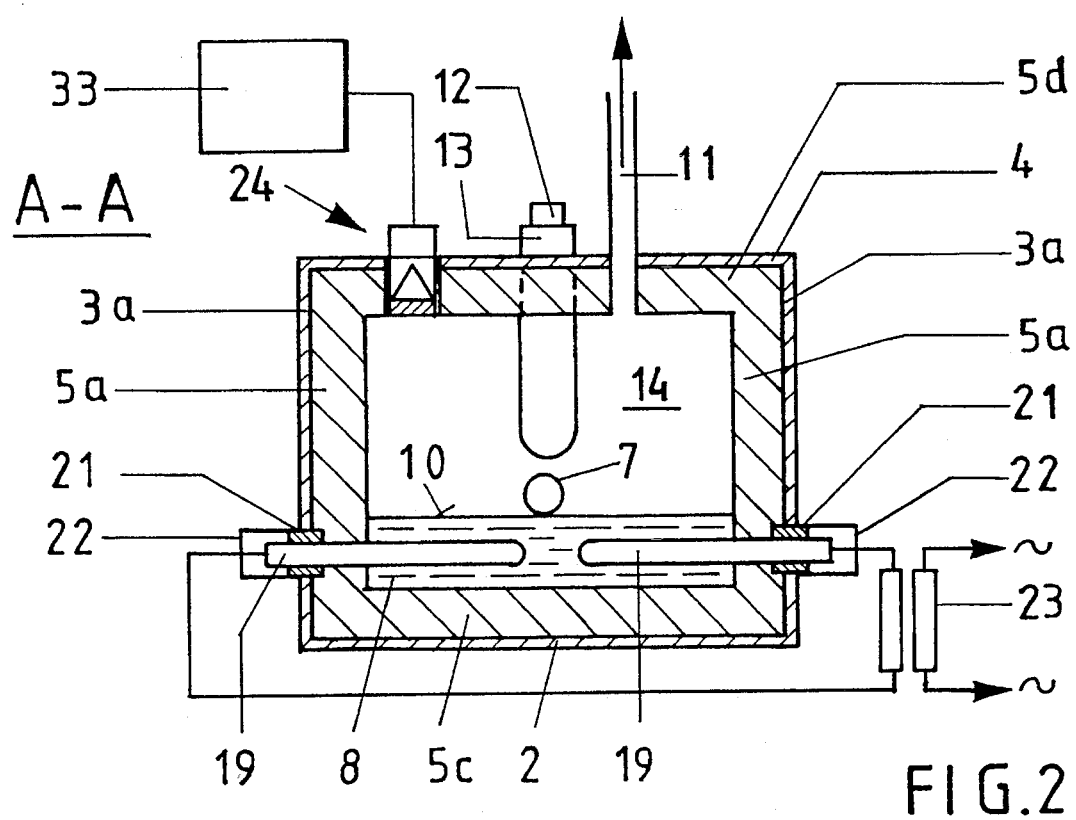
FIG. 2 is a cross sectional view of the melting furnace according to FIG. 1 along line AA.

In FIGS. 1 and 2 a melting furnace is denoted as 1. A metal housing contains bottom wall 2, side walls 3a, 3b, and cover 4 with a lining 5 with side walls 5a, 5b and bottom 5c and cover 5d made of refractory materials, as used, for example, in the construction of glass melting furnaces. The bottom part of the vessel interior forms the melting tank. The filter dust to be treated is fed to the tank via an inlet 6 by means of a loader, e.g. a conveyor screw, at a front wall of the furnace. The melt 8 leaves the actual furnace by way of a siphon at the opposite front wall 10, which for this purpose reaches as far as a passage 9 at the bottom 5c. The level N of the melt is below the conveyor screw 7 and above the passage 9. The volatile substances, which are released and converted through thermal treatment, leave the furnace via a gas outlet 11 (FIG. 2), which is disposed in the upper region of the region of the cover 4 opposite the inlet 6.

A first heater in the form of electric heating elements 12, which are jacketed by ceramic-based protective tubes 13, projects from the top into the gas chamber 14 of the furnace without dipping into the melt 8.

A melting furnace, as described above, the process for its operation, the processes that take place in the furnace, and the further treatment of the volatile substances leaving the furnace via the gas outlet 11 constitute the subject matter of the EP-A-0 313 902 or EP-A-0 359 931, to which explicit reference is made here for the purpose of avoiding repetition. At the occasion of the seminar "Garbage Incineration" of the Engineering Academy of Esslingen in Sarnen (Switzerland) on May 2 and 3, 1991, a report by the gentlemen J. Jochum, H. Jodeit and E. Schmidl with the title "The thermal treatment of residues according to the DEGLOR process" was distributed. Said report was about a pilot plant in Hinwil (Switzerland), which functions according to the aforementioned process.

A discharge chamber 15, which is connected to the principal furnace 1 via said siphon, is attached to the actual melting furnace 1. This discharge chamber 15 exhibits approximately the same construction as the principal furnace 1 and is heated by means of the second heating elements 16. The melt 8 leaves the discharge chamber via an overflow 18 at the chamber wall 5b opposite the siphon 9.

The connection of both furnaces (principal furnace 1 and discharge chamber 15), which are usually heated separately, is a critical region especially in phases with low throughput of material to be vitrified or during the start-up phase. It can happen that the melt gets too cold there and thus no longer flows very readily. The result is undesired differences in the levels in the two furnaces.

The region upstream of, in and downstream of the siphon is heated now according to the invention by means of additional heating elements 19, 20, in order to guarantee that the passage 9 of the siphon does not clog. For this additional heating the side wall 5a of both the principal furnace 1 and the discharge chamber 15 has now electrodes 19 or 20, which are disposed above the furnace floor 5c so as to be comparatively sealed, so that they are always covered by the melt. The bath electrodes—preferably they are made of molybdenum—can be pushed forward in the passages 21, interchanged, and covered externally by means of caps 22. To prevent the oxidation of hot molybdenum, the passages 21 are cooled with liquid or rinsed with an inert gas. The power for this "siphon heating" is supplied via a transformer 23, which is attached primarily to the normal alternating current network.

Figure 3:
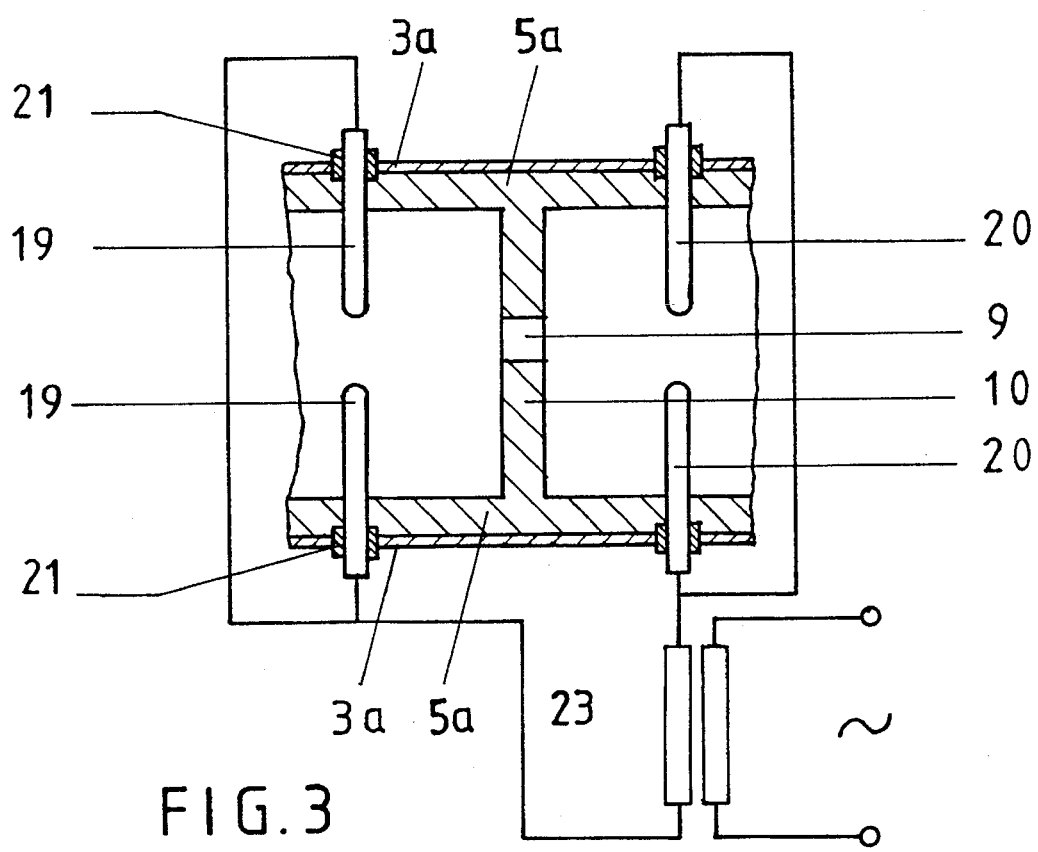
FIG. 3 is a simplified schematic drawing showing the distribution of pairs of bath electrodes and their electric feed supply, wherein two diametrically opposite bath electrodes are at the same pole of the power supply.

As evident from FIG. 2 and the diagram according to FIG. 3, the bath electrodes 19 and 20 are arranged in pairs on each side of the furnace. The wiring is run in such a manner that diametrically opposite bath electrodes are at the same pole of the power supply.

Figure 4:
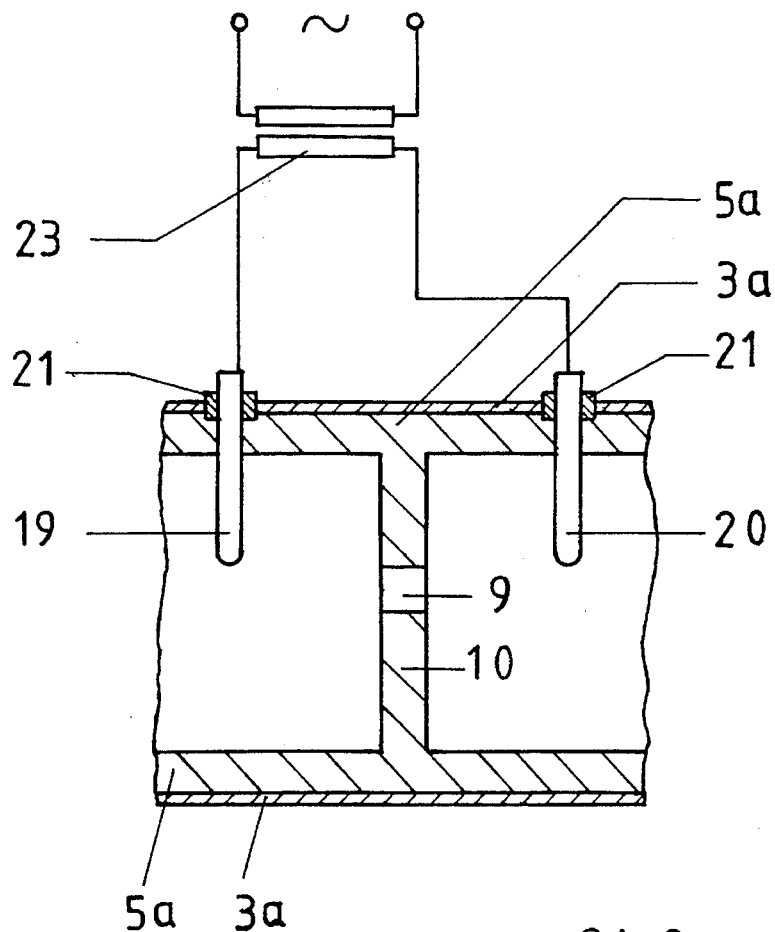
FIG. 4 is a simplified schematic drawing with only one pair of bath electrodes on one side of the furnace.
Figure 5:
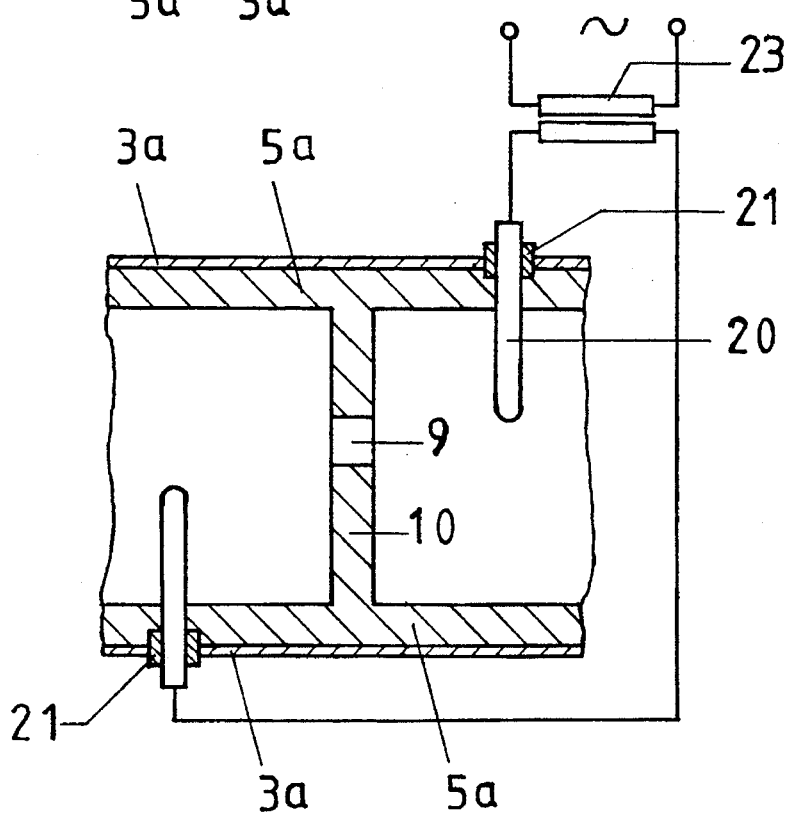
FIG. 5 is a simplified drawing with an alternative configuration of two diametrically opposite bath electrodes.
Figure 6:
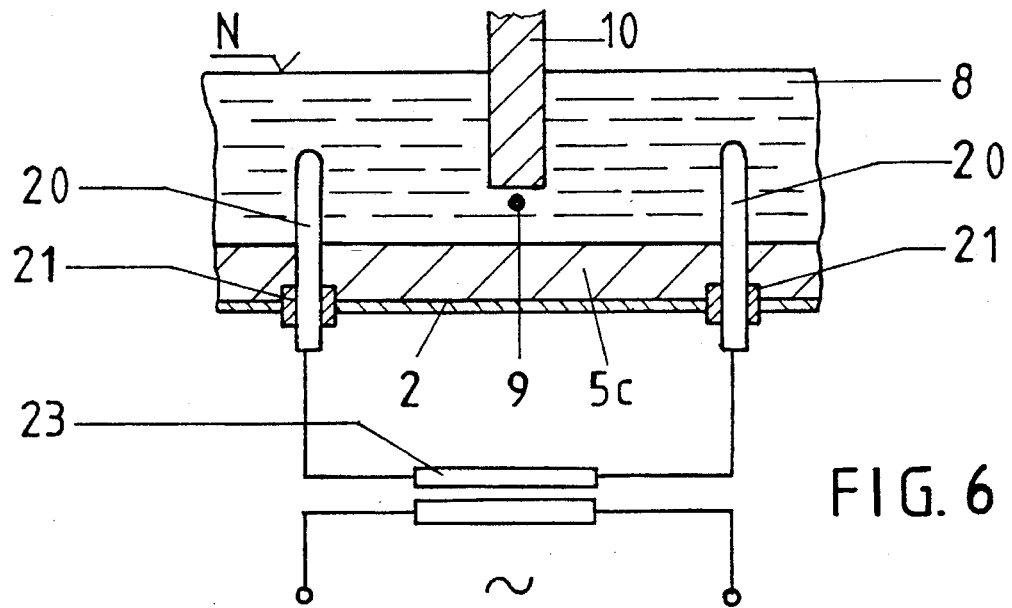
FIG. 6 is another alternative design with bath electrodes in the bottom of the melting furnace.

Another possibility—it is shown in FIGS. 4 and 5—provides that only one bath electrode 19 or 20 is arranged in the principal furnace 1 and in the discharge chamber 15, where the pair of bath electrodes can be disposed either on the same furnace side (FIG. 4) or on the opposite furnace side (FIG. 5) or also in the bottom of the principal furnace 1 and in the discharge chamber 15 (FIG. 6).

When there is only one bath electrode in the principal furnace 1 and discharge chamber 15 (FIGS. 4, 5, and 6), the bath electrodes 19 and 20 are attached to the two secondary winding terminals of the transformer 23. In the variation according to FIG. 3 the bottom electrodes 19 in the principal furnace 1 are run to both clamps of the transformer 23; and the bath electrodes 20 in the discharge chamber 15 are run to both both clamps of the transformer 23.

When connecting to the net, a current flows from the bath electrode(s) 19 through the melt 8, siphon 9 and the bath electrode(s) 20, which cause the melt to heat at least in the region of the current flow, thus in the siphon region.

Figure 7:
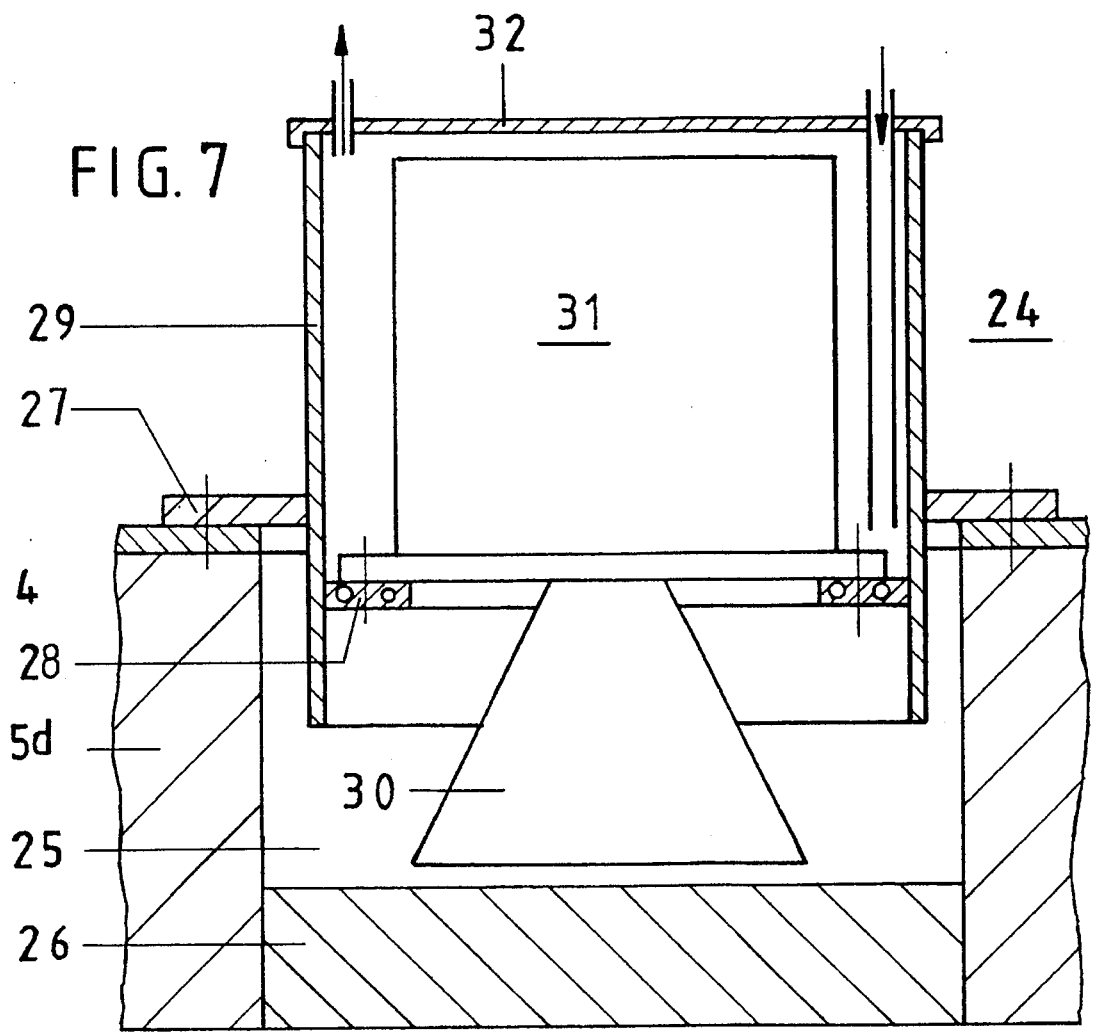
FIG. 7 is an enlarged cross sectional view of the device for monitoring the height of the bath level of the melt.

For contactless measurement of the level N of the melt 8 in the principal furnace 1, its cover has a radar ranging system 24 to acquire the height of the bath level of the melt. Said radar ranging device is depicted as a schematic drawing in FIG. 7 and on an enlarged scale with respect to FIG. 1. The cover of the principal furnace 1 is provided with a circular passage 25, which is closed with respect to the interior of the furnace with a shielding cylinder 26 made of highly temperature-stable material, e.g. ceramic. This material has to be transparent to microwaves. A piece of pipe 29 provided with an outer flange 27 and an inner flange 28 is put into the passage and screwed to the cover 4. On the inner flange rests the actual radar ranging system, of which only its conical antenna 30 with an opening diameter of 150 mm and its electric and electronic component, which is surrounded by a housing 31, are shown. A cover 32 protects the device with respect to external influences. The output signal of the radar ranging system 24 is fed to a display and evaluating unit 33, which is integrated into the plant control.

Radar ranging equipment of this kind is well-known and can be used for the purpose stipulated here in the foreground without any extensive modifications. Only adequate cooling of the mechanical and electric/electronic components has to be provided, e.g. through air cooling of the electric and electronic components, supplemented through liquid cooling of the inner flange 28—indicated by the cooling boreholes 28a in the flange 28—and/or the piece of pipe 29. Furthermore, it must observed that the material properties and also the height of the shielding cylinder are tuned to the wavelength of the radar, in order to avoid reflections.

During test measurements at a plant for melting residues from the incineration of garbage, the height of the melt bath could be accurately determined to 2 to 3 cm with a radar ranging system having a frequency of 5.8 Ghz and a conical antenna with an opening diameter of 150 mm.

It is self-evident that the discharge chamber 15 can also be provided with such radar ranging equipment 24.

| List of Reference Numerals | |
|---|---|
| 1 | principal melting furnace |
| 2 | bottom wall of 1 |
| 3 | side walls of 1 |
| 4 | cover of 1 |
| 5 | lining |
| 6 | inlet |
| 7 | conveyor screw |
| 8 | melt |
| 9 | siphon |
| 10 | partition between principal furnace and discharge chamber 15 |
| 11 | gas outlet |
| 12, 16 | electric heating elements |
| 13 | protective tubes |
| 14 | gas chamber |
| 15 | discharge chamber |
| 18 | overflow |
| 19, 20 | bath electrodes |
| 21 | ceramic passages |
| 22 | hood of 19, 20 |
| 23 | transformer |
| 24 | radar ranging equipment |
| 25 | passage into the furnace cover |
| 26 | shielding cylinder |
| 27 | outer flange of 29 |
| 28 | inner flange of 29 |
| 28a | cooling boreholes in 28 |
| 29 | piece of pipe |
| 30 | antenna |
| 31 | housing |
| 32 | cover of 29 |
| 33 | display and evaluating unit |
| N | level of the melt |

What is claimed as new and desired to be secured by Letters Patent of the United States is:

1. Melting furnace for thermal treatment of at least one of heavy metal-containing and dioxin-containing special wastes, comprising a principal furnace vessel, which exhibits a melting tank for holding a melt; at least one feeder for feeding the material to be treated; at least one discharge chamber, which is at a spatial distance from the feeder and which is connected via a siphon to the melting tank; at least one first heater, projecting into the interior of the furnace vessel, and at least one second heater projecting into the discharge chamber, wherein the principal furnace vessel and the discharge chamber have third heating elements in the form of bath electrodes, by means of which an electric current is run through the melt and the siphon for additional heating of the melt.

2. Melting furnace as claimed in claim 1, wherein the bath electrodes project from one of a side and a bottom of the melting tank into the melt.

3. Melting furnace as claimed in claim 1, wherein a cover of at least the principal furnace vessel has a device based on the principle of radar ranging, in order to acquire without contact the height of the bath level of the melt.

4. Melting furnace as claimed in claim 2, wherein a cover of at least the principal furnace vessel has a device based on the principle of radar ranging, in order to acquire without contact the height of the bath level of the melt.

5. Melting furnace as claimed in claim 3, wherein the cover of at least one of the furnace vessel and the discharge chamber has a passage which is closed with respect to the interior of the furnace and into which said radar ranging system is embedded.

6. Melting furnace as claimed in claim 4, wherein the cover of at least one of the furnace vessel and the discharge chamber has a passage which is closed with respect to the interior of the furnace and into which said radar ranging system is embedded.

\* \* \* \* \*